(12) United States Patent
Bai

(10) Patent No.: US 10,635,608 B2
(45) Date of Patent: Apr. 28, 2020

(54) METHOD FOR PERFORMING COMMUNICATION BETWEEN PERIPHERAL DEVICES OF MOBILE TERMINAL AND MOBILE TERMINAL

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 6 days.

(21) Appl. No.: 15/805,879

(22) Filed: Nov. 7, 2017

(65) Prior Publication Data

US 2018/0189198 A1    Jul. 5, 2018

(30) Foreign Application Priority Data

Dec. 30, 2016   (CN) .......................... 2016 1 1265359

(51) Int. Cl.
   *G06F 13/12*        (2006.01)
   *G06F 13/24*        (2006.01)
   (Continued)

(52) U.S. Cl.
   CPC ............ *G06F 13/124* (2013.01); *G06F 1/266* (2013.01); *G06F 1/28* (2013.01); *G06F 13/4022* (2013.01);
   (Continued)

(58) Field of Classification Search
   CPC ......... G06F 13/124; G06F 13/14; G06F 1/266
   See application file for complete search history.

(56) References Cited

U.S. PATENT DOCUMENTS

| 6,212,589 | B1 | 4/2001 | Hayek |
| 2004/0003145 | A1 | 1/2004 | Schneiderman |

(Continued)

FOREIGN PATENT DOCUMENTS

| CN | 201583943 U | 9/2010 |
| CN | 102005028 A | 4/2011 |

(Continued)

OTHER PUBLICATIONS

PCI Special Interest Group;"PCI Local Bus Specification", Dec. 18, 1998, No. Revision 2.2, Dec. 18, 1998 (Dec. 18, 1998), pp. I-IX, 1, XP002574922, *figures 1-2 * * p. 5 * * pp. 21,22 *, mailed on Dec. 18, 1998.

(Continued)

*Primary Examiner* — Zachary K Huson

(57) ABSTRACT

The embodiments of the disclosure disclose a communication method between peripheral devices of a mobile terminal and a mobile terminal. The mobile terminal includes at least two peripheral device and a bus, wherein each of the at least two peripheral devices is directly connected to the bus, and the at least two peripheral devices communicate with each other via the bus. A first peripheral device of the at least two peripheral devices is configured to send, when the first peripheral device needs to access a second peripheral device of the at least two peripheral devices, an access instruction to the second peripheral device via the bus; and the second peripheral device is configured to receive the access instruction, and execute an operation corresponding to the access instruction.

20 Claims, 11 Drawing Sheets

(51) Int. Cl.
G06F 13/40 (2006.01)
G06F 1/26 (2006.01)
G06F 1/28 (2006.01)
G06F 13/42 (2006.01)

(52) U.S. Cl.
CPC ...... *G06F 13/4031* (2013.01); *G06F 13/4068* (2013.01); *G06F 13/4282* (2013.01); *G06F 13/24* (2013.01)

(56) References Cited

U.S. PATENT DOCUMENTS

| | | | |
|---|---|---|---|
| 2013/0238582 A1 | 9/2013 | Li et al. | |
| 2013/0341399 A1* | 12/2013 | Xian | G06K 7/1098 235/449 |
| 2014/0189177 A1* | 7/2014 | Flint | G06F 13/4282 710/110 |
| 2016/0192120 A1* | 6/2016 | Lin | H04L 43/065 455/41.2 |
| 2016/0249212 A1* | 8/2016 | Padur | H04W 12/06 |
| 2016/0292107 A1 | 10/2016 | Kim | |
| 2017/0272654 A1* | 9/2017 | Poindexter, Jr. | H04N 5/23245 |
| 2017/0311021 A1* | 10/2017 | Peng | H04N 21/2668 |

FOREIGN PATENT DOCUMENTS

| | | |
|---|---|---|
| CN | 102129530 A | 7/2011 |
| CN | 105426141 A | 3/2016 |
| CN | 105677592 A | 6/2016 |
| CN | 105744463 A | 7/2016 |
| CN | 106844264 A | 6/2017 |

OTHER PUBLICATIONS

Supplementary European Search Report in European application No. 17195912.5, dated Apr. 26, 2018.
International Search Report in international application No. PCT/CN2017/115910, dated Mar. 12, 2018.
English Translation of the Written Opinion of the International Search Authority in international application No. PCT/CN2017/115910, dated Mar. 12, 2018.

* cited by examiner

METHOD FOR PERFORMING COMMUNICATION BETWEEN PERIPHERAL DEVICES OF MOBILE TERMINAL AND MOBILE TERMINAL

CROSS-REFERENCE TO RELATED APPLICATIONS

This application is filed based upon and claims priority to Chinese Patent Application No. 201611265359.7, entitled "Mobile Terminal", filed on Dec. 30, 2016. The entire contents of the application are incorporated herein by reference.

TECHNICAL FIELD

The disclosure relates to the technical field of terminal electrons, and in particular, to a method for performing communication among peripheral devices of a mobile terminal and a mobile terminal.

BACKGROUND

At present, communication information between various peripheral devices inside a terminal are transferred via an Application Processor (AP). For example, peripheral devices such as a Radio Frequency (RF) module, a Wireless Fidelity (WIFI) module, a power supply and a memory cannot be interconnected, and thus communication information therebetween are transferred via the AP.

For example, when a peripheral device needs to communicate with another peripheral device, this peripheral device sends a communication message to an AP. Then, the AP transmits the communication message to the another peripheral device. Thus, communications between all peripheral devices are transferred via the AP, and therefore load on the AP is increased.

SUMMARY

The embodiments of the disclosure provide a method for performing communication between peripheral devices of a mobile terminal and a mobile terminal.

According to an aspect, a mobile terminal is provided. The mobile terminal includes at least two peripheral devices and a bus, wherein each of the peripheral devices are directly connected to the bus, and the at least two peripheral devices communicate with each other via the bus. A first peripheral device of the at least two peripheral devices is configured to send, when the first peripheral device needs to access a second peripheral device of the at least two peripheral devices, an access instruction to the second peripheral device via the bus; and the second peripheral device is configured to receive the access instruction, and execute an operation corresponding to the access instruction.

According to another aspect, a method for performing communication among multiple peripheral devices of a mobile terminal is provided. The mobile terminal includes at least two peripheral device sets and a bus, wherein each of the at least two peripheral device sets is directly connected to the bus, each of the at least two peripheral device sets includes at least one peripheral device, and the at least two peripheral device sets communicate with each other via the bus. The method includes: when a first peripheral device of a first peripheral device set needs to access a second peripheral device of a second peripheral device set, the first peripheral device of the first peripheral device set sends an access instruction to the second peripheral device of the second peripheral device set via the bus; and the second peripheral device of the second peripheral device set receives the access instruction, and executes an operation corresponding to the access instruction.

According to yet another aspect, a mobile terminal is provided. The mobile terminal includes at least two peripheral device sets and a bus, wherein each of the at least two peripheral device sets is directly connected to the bus, each of the at least two peripheral device sets includes at least one peripheral device, and the at least two peripheral device sets communicate with each other via the bus. A first peripheral device of a first peripheral device set of the at least two peripheral device sets is configured to send, when the first peripheral device of the first peripheral device set needs to access a second peripheral device of a second peripheral device set of the at least two peripheral device set, an access instruction to the second peripheral device set via the bus; and the second peripheral device of the second peripheral device set is configured to receive the access instruction, and execute an operation corresponding to the access instruction.

According to still yet another aspect, a mobile terminal is provided. The mobile terminal includes at least two peripheral devices and a bus. Each of the peripheral devices is connected with the bus, and the at least two peripheral devices communicate with each other via the bus.

BRIEF DESCRIPTION OF DRAWINGS

In order to more clearly illustrate the technical solutions in the embodiments of the disclosure, accompanying drawings needing to be used in the descriptions of the embodiments will be simply introduced hereinbelow. It is apparent that the drawings described hereinbelow are merely some embodiments of the disclosure. A person of ordinary skill in the art may also obtain other drawings according to these drawings without making creative works.

DETAILED DESCRIPTION

Figure 1:
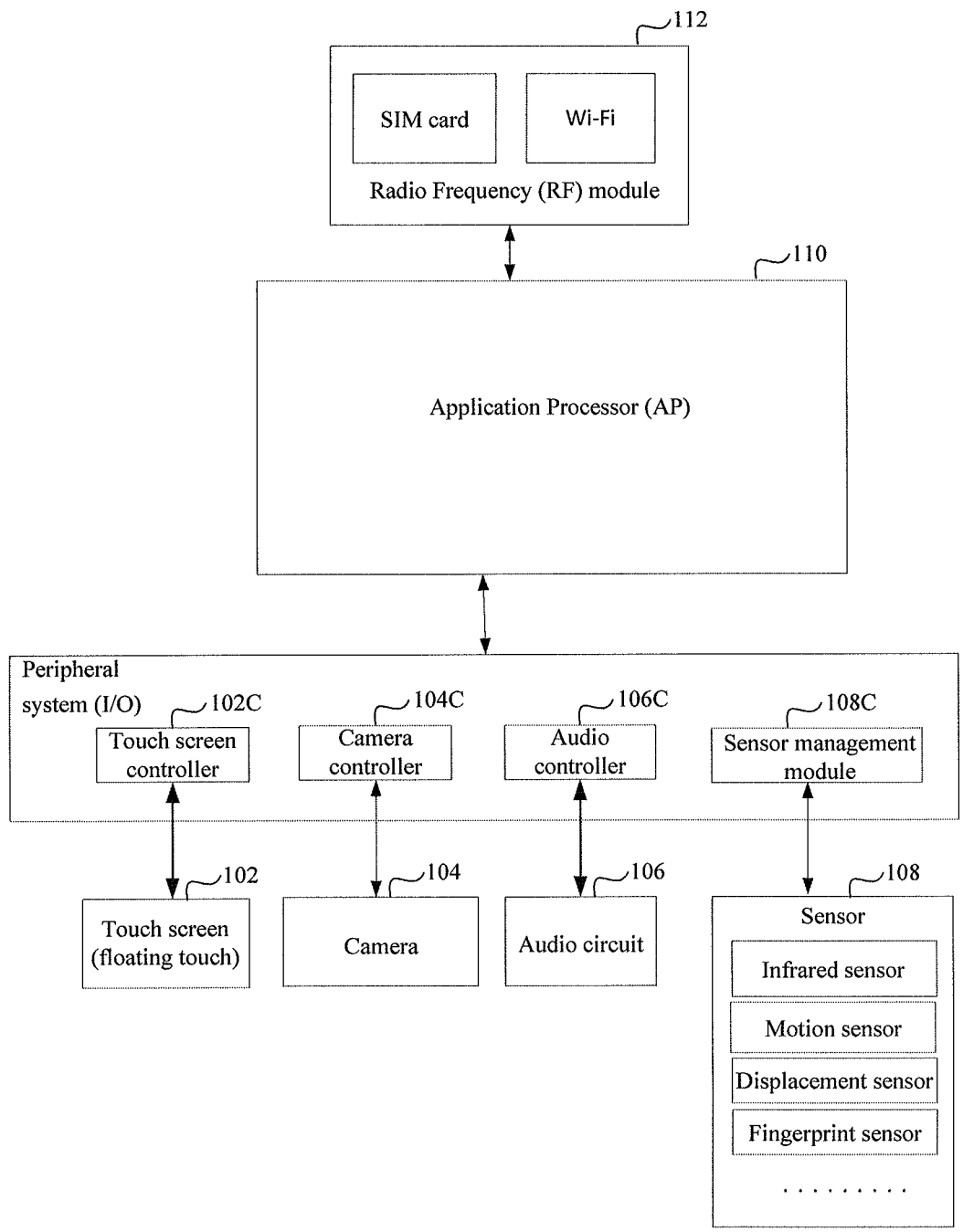
FIG. 1 is a diagram illustrating a hardware architecture of a mobile terminal in the related art.

The technical solutions in the embodiments of the disclosure will be clearly and completely described hereinbelow with reference to the drawings in the embodiments of the disclosure. It is apparent that the described embodiments are only a part of the embodiments of the disclosure, not all of the embodiments. On the basis of the embodiments of the disclosure, any other embodiments obtained by a person skilled in the art without making creative work should fall within the scope of protection of the disclosure.

The terms "first", "second" and the like in the specification, claims and accompany drawings of the disclosure are used for distinguishing different objects rather than describing a specific sequence. In addition, terms "include" and "have" and any inflexions thereof are intended to refer to non-exclusive inclusions. For example, processes, methods, systems, products or devices containing a series of steps or units are not limited to operations or units which have been already listed, and other operations or units which are not listed or are inherent to these processes, methods, products or devices are optionally included instead.

Reference to "Embodiments" in the disclosure means that specific features, structures or characteristics described in the embodiments may be included in at least one embodiment of the disclosure. The term occurring at various positions in the specification does not always refer to the same embodiment, or not an independent or alternative embodiment with which other embodiments are mutually exclusive. A person skilled in the art explicitly and implicitly understands that the embodiments described in the disclosure may be combined with other embodiments.

A mobile terminal described in the embodiments of the disclosure may include a smart phone (e.g., an Android phone, an iOS phone and a Windows Phone), a tablet, a palmtop, a laptop, Mobile Internet Devices (MID), a wearable device or the like. The above terminals are only exemplary, not exhaustive. The mobile terminal may include, but is not limited to the above terminals.

The embodiments of the disclosure provide a method for performing communication between peripheral devices of a mobile terminal and a mobile terminal.

At least some embodiments of the disclosure provide a mobile terminal, comprising at least two peripheral devices and a bus, each of the at least two peripheral devices being directly connected to the bus, the at least two peripheral devices communicating with each other via the bus, wherein a first peripheral device of the at least two peripheral devices is configured to send, when the first peripheral device needs to access a second peripheral device of the at least two peripheral devices, an access instruction to the second peripheral device via the bus; and the second peripheral device is configured to receive the access instruction, and execute an operation corresponding to the access instruction.

According to at least some embodiments, the mobile terminal further comprises an Application Processor (AP), wherein the at least two peripheral devices are directly connected to the AP.

According to at least some embodiments, the first peripheral device is configured to monitor, before the first peripheral device sends an access instruction to the second peripheral device via the bus, whether the bus is idle; and the first peripheral device is further configured to send, when it is monitored by the first peripheral device that the bus is idle, an access instruction to the second peripheral device via the bus.

According to at least some embodiments, the at least two peripheral devices are at least two selected from a group consisting of a Radio Frequency (RF) module, a Wireless Fidelity (WIFI) module, a power supply, a memory, a camera, a touch screen, an audio playing module, a sensor and a display screen.

According to at least some embodiments, the first peripheral device is the camera, the second peripheral device is the memory, the access instruction is a storage instruction and the access instruction contains a picture captured by the camera, and wherein the second peripheral device is configured to receive the access instruction, parse the access instruction to obtain the picture, and store the picture.

According to at least some embodiments, the first peripheral device is the WIFI module, the second peripheral device is the power supply and the access instruction is an acquisition instruction for acquiring capacity of the power supply, and wherein the second peripheral device is configured to receive the access instruction, detect its own capacity, and feed back the capacity to the WIFI module.

According to at least some embodiments, the first peripheral device is the camera, the second peripheral device is the touch screen, the access instruction is a picture editing instruction and the access instruction contains a picture captured by the camera, and wherein the second peripheral device is configured to receive the access instruction, parse the access instruction to obtain the picture, capture an operating track of a user, and edit the picture according to the operating track.

According to at least some embodiments, the first peripheral device is the WIFI module, the second peripheral device is the audio playing module, the access instruction is an audio playing instruction and the access instruction contains audio data received by the WIFI module, and wherein the second peripheral device is configured to receive the access instruction, parse the access instruction to obtain the audio data and play the audio data.

According to at least some embodiments, the first peripheral device comprises the sensor, the second peripheral device comprises the display screen, the access instruction is a brightness adjustment instruction for adjusting brightness of the display screen, and the access instruction contains sensing data that has been sensed by the sensor; and the second peripheral device is configured to receive the access instruction, parse the access instruction to obtain the sensing data, and adjust the brightness of the display screen according to the sensing data.

According to at least some embodiments, the second peripheral device is further configured to feed back, after the second peripheral device executes the operation corresponding to the access instruction, information about a result of the operation to the first peripheral device; and the first peripheral device is further configured to adjust its own state according to the information about the result of the operation.

At least some embodiments of the disclosure provide a method for performing communication among a plurality of peripheral devices of a mobile terminal, the mobile terminal comprising at least two peripheral device sets and a bus, each of the at least two peripheral device sets being directly connected to the bus, each of the at least two peripheral device sets comprising at least one peripheral device, the at least two peripheral device sets communicating with each other via the bus, the method comprising: when a first peripheral device of a first peripheral device set needs to access a second peripheral device of a second peripheral device set, sending, by the first peripheral device of the first peripheral device set, an access instruction to the second peripheral device of the second peripheral device set via the bus; and receiving, by the second peripheral device of the second peripheral device set, the access instruction, and executing an operation corresponding to the access instruction.

According to at least some embodiments, the method further comprises: before the first peripheral device of the first peripheral device set sends an access instruction to the second peripheral device of the second peripheral device set via the bus, monitoring whether the bus is idle; and when it is monitored by the first peripheral device of the first peripheral device set that the bus is idle, sending, by the first peripheral device of the first peripheral device set, the access instruction to the second peripheral device of the second peripheral device set via the bus.

At least some embodiments of the disclosure provide a mobile terminal, comprising at least two peripheral device sets and a bus, each of the at least two peripheral device sets being directly connected to the bus, each of the at least two peripheral device sets comprising at least one peripheral device, the at least two peripheral device sets communicating with each other via the bus, wherein a first peripheral device of a first peripheral device set of the at least two peripheral device sets is configured to send, when the first peripheral device of the first peripheral device set needs to access a second peripheral device of a second peripheral device set of the at least two peripheral device set, an access instruction to the second peripheral device set via the bus; and the second peripheral device of the second peripheral device set is configured to receive the access instruction, and execute an operation corresponding to the access instruction.

According to at least some embodiments, the mobile terminal further comprises an Application Processor (AP), wherein the at least two peripheral device sets are directly connected to the AP.

According to at least some embodiments, the first peripheral device of the first peripheral device set is configured to monitor, before the first peripheral device of the first peripheral device set sends an access instruction to the second peripheral device of the second peripheral device set via the bus, whether the bus is idle; and the first peripheral device of the first peripheral device set is further configured to send, when it is monitored by the first peripheral device of the first peripheral device set that the bus is idle, the access instruction to the second peripheral device of the second peripheral device set via the bus.

According to at least some embodiments, the at least one peripheral device is selected from a group consisting of a Radio Frequency (RF) module, a Wireless Fidelity (WIFI) module, a power supply, a memory, a camera, a touch screen, an audio playing module, a sensor and a display screen.

According to at least some embodiments, the first peripheral device is the camera, the second peripheral device is the memory, the access instruction is a storage instruction and the access instruction contains a picture captured by the camera, and wherein the second peripheral device of the second peripheral device set is configured to receive the access instruction, parse the access instruction to obtain the picture and store the picture.

According to at least some embodiments, the first peripheral device is the WIFI module, the second peripheral device is the power supply and the access instruction is an acquisition instruction for acquiring capacity of the power supply, and wherein the second peripheral device of the second peripheral device set is configured to receive the access instruction, detect the capacity of the power supply and feed back the capacity to the WIFI module.

According to at least some embodiments, the first peripheral device is the camera, the second peripheral device is the touch screen, the access instruction is a picture editing instruction and the access instruction contains a picture captured by the camera, and wherein the second peripheral device of the second peripheral device set is configured to receive the access instruction, parse the access instruction to obtain the picture, capture an operating track of a user and edit the picture according to the operating track.

According to at least some embodiments, the first peripheral device is the WIFI module, the second peripheral device is the audio playing module, the access instruction is an audio playing instruction and the access instruction contains audio data received by the WIFI module, and wherein the second peripheral device of the second peripheral device set is configured to receive the access instruction, and parse the access instruction to obtain the audio data and play the audio data.

At least some embodiments of the disclosure provide a mobile terminal. The mobile terminal includes at least two peripheral devices and a bus. Each of the peripheral devices is connected with the bus, and the at least two peripheral devices communicate with each other via the bus.

The hardware architecture of the mobile terminal provided in the embodiment of the disclosure will be described in detail hereinbelow with reference to FIGS. 1 to 11.

FIG. 1 is a diagram illustrating a hardware architecture of a mobile terminal in the related art. As illustrated in FIG. 1, a hardware architecture in the related art includes an AP 110 and a peripheral system. The peripheral system includes a plurality of peripheral devices such as a touch screen 102, a camera (e.g., three-dimensional camera) 104, an audio circuit 106, a sensor 108 and an RF module 112, as well as a touch screen controller 102C, a camera controller 104C, an audio controller 106C and a sensor management module 108C.

Each of the peripheral devices is connected to the AP 110. When a peripheral device needs to communicate with another peripheral device, the peripheral device sends a communication request to the AP 110. Then, the AP 110 analyzes the communication request to determine a target peripheral device corresponding to the communication request. Then, the AP 110 forwards the communication request to the target peripheral device to process the communication request. Optionally, the communication request may refer to a request for acquiring data from the target peripheral device, or a request for controlling the target peripheral device to execute operations and the like corresponding to the request.

It can thus be seen that in the related art, communications between all peripheral devices need to be transferred via an AP, thereby greatly increasing loads on the AP.

Figure 2:
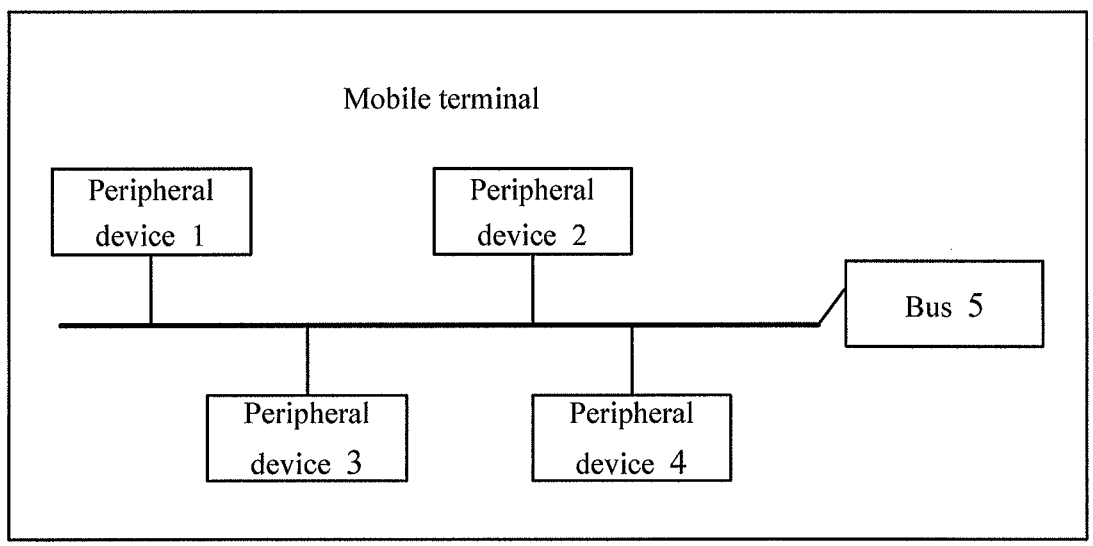
FIG. 2 is a diagram illustrating a hardware architecture of a mobile terminal according to an embodiment of the disclosure.

FIG. 2 is a diagram illustrating a hardware architecture of a new mobile terminal according to an embodiment of the disclosure. As illustrated in FIG. 2, the hardware architecture of the mobile terminal according to the embodiment of the disclosure adopts a peripheral bus. That is, the hardware architecture of the mobile terminal may include a plurality of peripheral devices 1-4 and a bus 5. Each of the peripheral devices 1-4 is connected to the bus 5. Therefore, all the peripheral devices may be connected and communicated with each other.

When peripheral devices need to communicate with each other, an access instruction is directly sent by a peripheral device to a target peripheral device without transferring communication via an AP. After receiving the access instruction, the target peripheral device executes a corresponding operation.

As illustrated in FIG. 2, the hardware architecture of the mobile terminal according to an embodiment of the disclosure is illustrated with four peripheral devices 1-4. It will be understood that the four peripheral devices 1-4 here are only taken as an example, and that the mobile terminal according to the embodiment of the disclosure may include another number of the peripheral devices. For example, the mobile terminal according to the embodiment of the disclosure may include three, seven or even more peripheral devices. A peripheral device 1, a peripheral device 2, a peripheral device 3 and a peripheral device 4 are all connected to a bus 5. All the peripheral devices 1-4 may communicate with each other via the bus 5. For example, when the peripheral device 1 needs to communicate with the peripheral device 4, the peripheral device 1 may send an access instruction to the peripheral device 4 via the bus 5. The access instruction may be a data instruction or a control instruction. After receiving the access instruction, the peripheral device 4 executes an operation corresponding to the access instruction.

Optionally, a peripheral bus is adopted, so access instructions of all the peripheral devices 1-4 are transferred via the bus 5. Therefore, in order to enable each of the peripheral devices 1-4 to distinguish whether the access instruction is an instruction sent to itself, each access instruction may include an identifier of a peripheral device to be accessed. The identifier may be a unique identifier pre-allocated to each peripheral device.

Meanwhile, each peripheral device may monitor, via the bus 5, whether there is an access instruction sent to itself. In one embodiment, each of the peripheral devices 1-4 may distinguish, according to an identifier carried in an access instruction, whether the access instruction is an instruction sent to itself. That is, each of the peripheral devices 1-4 may judge whether an identifier carried in an access instruction is matched with its own identifier. When an identifier carried in an access instruction is matched with an identifier of a peripheral device, it indicates that the access instruction is an access instruction sent to the peripheral device. When an identifier carried in an access instruction is not matched with an identifier of a peripheral device, it indicates that the access instruction is not an access instruction sent to the peripheral device, and accordingly the peripheral device does not parse the access instruction.

Figure 3:
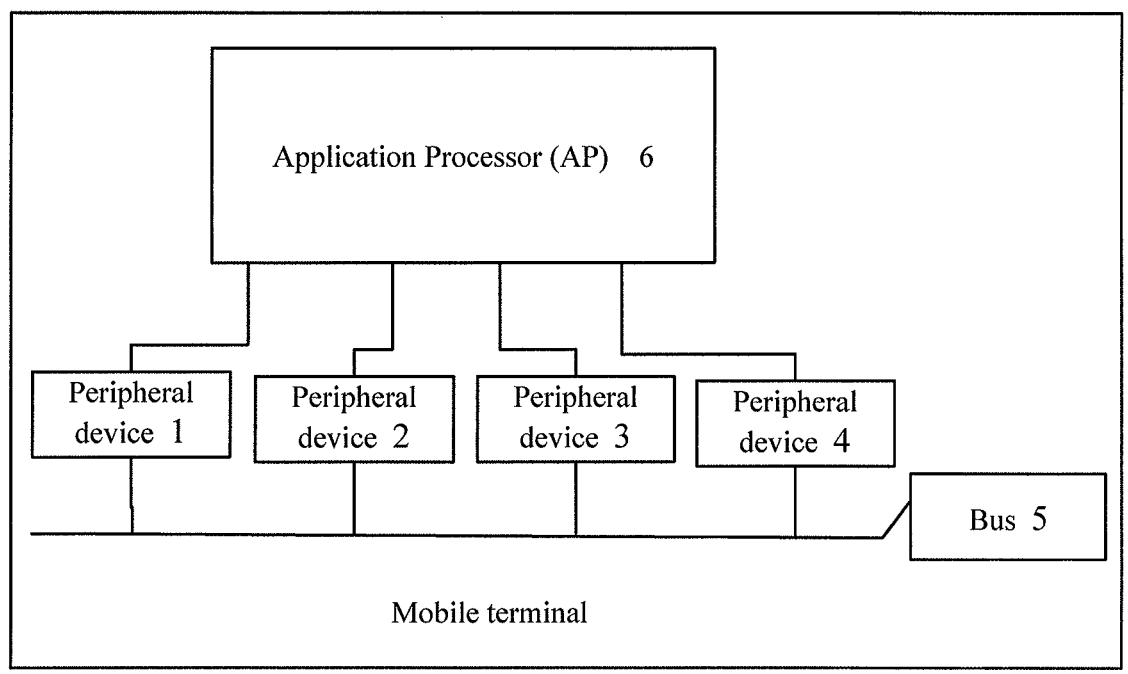
FIG. 3 is a diagram illustrating a hardware architecture of another mobile terminal according to an embodiment of the disclosure.

Optionally, FIG. 3 is a diagram illustrating a hardware architecture of another mobile terminal according to an embodiment of the disclosure. The hardware architecture of the mobile terminal in the embodiment of the disclosure is improved on the basis of the hardware architecture diagram of FIG. 2. In order to be compatible with an existing hardware architecture, the hardware architecture of the terminal according to the embodiment of the disclosure may further include an AP 6. Therefore, the peripheral devices 1-4 not only can be connected and communicated with each other via the bus 5, but also can be directly connected to the AP 6. That is, communication between the peripheral devices 1-4 not only can be directly accessed via the bus 5, but also can be transferred via the AP 6.

In some embodiments, selection switches may be arranged on the terminal for selecting two communication modes. Thus, when developing a terminal hardware architecture, research staff may select any one of the communication modes. For example, the research staff may select a peripheral bus communication mode or a traditional AP transfer communication mode.

In the embodiment of the disclosure, the mobile terminal includes at least two peripheral devices and a bus, and each of the peripheral devices is directly connected to the bus. Therefore, all the peripheral devices are connected and communicated with each other via the bus. For example, when a first peripheral device needs to access a second peripheral device, i.e., when a first peripheral device sends an access instruction to a second peripheral device via a bus, the second peripheral device executes an operation corresponding to the access instruction. Therefore, communications between peripheral devices do not need to be transferred by an AP, thereby alleviating burdens on the AP, and improving the efficiency of the communication between the peripheral devices.

Figure 4:
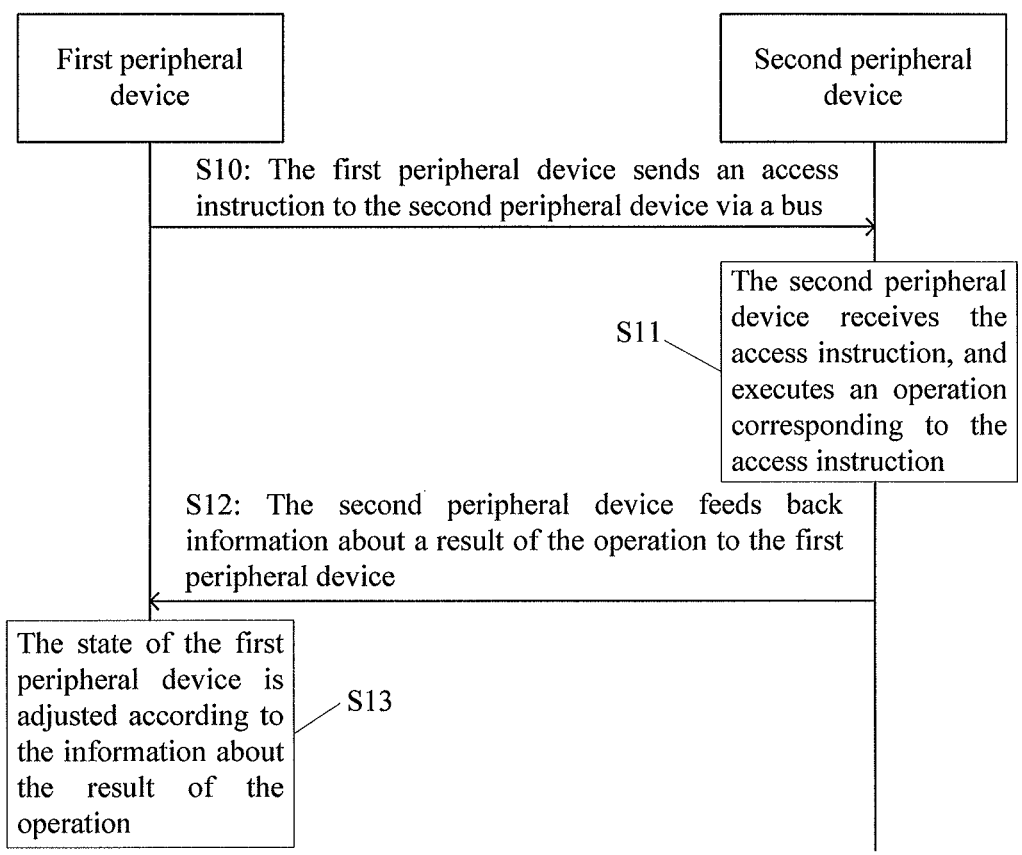
FIG. 4 is a diagram illustrating information interaction according to an embodiment of the disclosure.

A communication process between a first peripheral device and a second peripheral device is described in conjunction with the hardware architecture of the mobile terminal in FIG. 2 and with reference to FIG. 4. In other words, the communication process between the first peripheral device and the second peripheral device is illustrated with reference to FIG. 4 and in conjunction with a signal flow in FIG. 2. As illustrated in FIG. 4, the first peripheral device may be a peripheral device (i.e., one of a peripheral device 1, a peripheral device 2, a peripheral device 3 and a peripheral device 4) in FIG. 2, and the second peripheral device may be another peripheral device (i.e., another of the peripheral device 1, the peripheral device 2, the peripheral device 3 and the peripheral device 4) in FIG. 2. As illustrated in FIG. 4, the communication process includes operations as illustrated in S10 to S12.

In S10, when a first peripheral device needs to access a second peripheral device, the first peripheral device sends an access instruction to the second peripheral device via a bus.

In one embodiment, the first peripheral device may include at least one peripheral device, and the second peripheral device may also include at least one peripheral device. When the first peripheral device needs to access the second peripheral device, the first peripheral device sends an access instruction to the second peripheral device via a bus.

Optionally, the access instruction may be a data instruction. For example, when the first peripheral device needs to store data into the second peripheral device, the access instruction may contain data to be stored, and the second peripheral device stores data contained in the data access instruction.

Optionally, the access instruction may be a control instruction. For example, when the first peripheral device needs to control the second peripheral device to execute a corresponding operation, the access instruction may contain an operation instruction for indicating the operation to be executed. When receiving the access instruction, the second peripheral device executes a corresponding operation according to the operation instruction.

Access instructions between all peripheral devices are transmitted via the bus respectively, and the quantity of the access instructions transmitted by the bus within a certain time range is limited. Therefore, optionally, before sending the access instruction to the second peripheral device, the first peripheral device may monitor whether the bus is idle. Here, "the bus is idle" may refer to that a load of the bus for a certain time period is smaller than or equal to a preset threshold.

If it is monitored by the first peripheral device that the bus is idle, the first peripheral device may send the access instruction to the second peripheral device.

In S11, the second peripheral device receives the access instruction, and executes an operation corresponding to the access instruction.

In one embodiment, after receiving the access instruction, the second peripheral device parses the access instruction to obtain an operation to be executed. For example, the operation to be executed may be a storage operation, an editing operation or the like.

When the second peripheral device obtains the operation to be executed, the second peripheral device executes the corresponding operation.

In an embodiment, the signal flow in the embodiment of the disclosure may further include operations as illustrated in S12 to S13.

In S12, the second peripheral device may feed back information about a result of the operation to the first peripheral device.

In one embodiment, in some application scenarios, after executing a corresponding operation, a second peripheral device needs to feed back information about a result of the operation to a first peripheral device. For example, the first peripheral device may be a WIFI module, and the second peripheral device may be a power supply. The first peripheral device intends to query the remaining capacity of the second peripheral device to determine whether to turn off the WIFI module. After the first peripheral device sends an access instruction to the second peripheral device, the second peripheral device returns the remaining capacity to the first peripheral device. When the remaining capacity is smaller than a predetermined threshold, the first peripheral device may determine that it is necessary to turn off the WIFI module, to avoid further power consumption of the WIFI module.

In S13, the first peripheral device may adjust the state of the first peripheral device according to the information about the result of the operation.

In one embodiment, after receiving information about a result of the operation of the second peripheral device, the first peripheral device adjusts its state according to the information about the result of the operation. Optionally, when the first peripheral device is a terminal display screen, the terminal display screen may be lightened or darkened. When the first peripheral device is a WIFI module of the terminal, the WIFI module may be turned on or turned off.

In the embodiment of the disclosure, the hardware architecture of the mobile terminal includes at least two peripheral devices and a bus, and each of the peripheral devices are directly connected to the bus. Therefore, all the peripheral devices are connected and communicated with each other via the bus. For example, when a first peripheral device needs to access a second peripheral device, i.e., when a first peripheral device sends an access instruction to a second peripheral device via a bus, the second peripheral device executes an operation corresponding to the access instruction. Therefore, communications between peripheral devices do not need to be transferred by an AP. In this manner, burdens on the AP can be alleviated, and the efficiency of the communication between the peripheral devices is improved.

Referring to FIGS. 5 to 9, according to some embodiments of the disclosure, each of the procedures of the interactions between a first peripheral device and a second peripheral device in five alternative application scenarios is illustrated.

Figure 5:
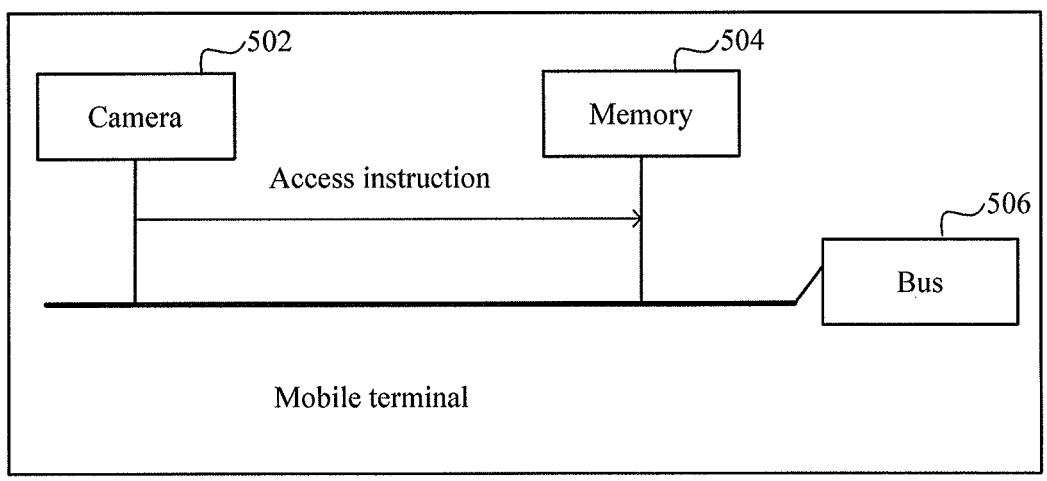
FIG. 5 is a diagram illustrating information interaction between a camera and a memory according to an embodiment of the disclosure.

As illustrated in FIG. 5, the first peripheral device may be a camera 502, and the second peripheral device may be a memory 504. The camera 502 may be connected and communicated with the memory 504 via a bus 506. After capturing a picture, the camera 502 needs to store the picture into the memory. The camera 502 may send an access instruction to the memory 504 via the bus 506. The access instruction is a storage instruction, and the access instruction contains the picture captured by the camera.

After receiving the access instruction, the memory 504 may parse the access instruction. Thus, the memory 504 may be informed of the access instruction which indicates that the picture carried in the access instruction is to be stored into the memory 504. The memory 504 may then execute a corresponding storage operation.

Figure 6:
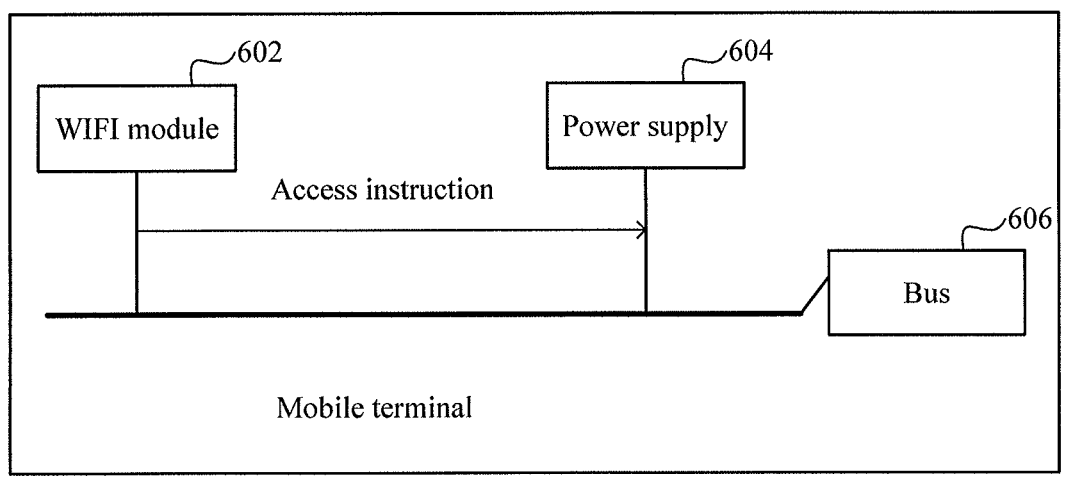
FIG. 6 is a diagram illustrating information interaction between a WIFI module and a power supply according to an embodiment of the disclosure.

As illustrated in FIG. 6, the first peripheral device may be a WIFI module 602, and the second peripheral device may be a power supply 604. When the WIFI module 602 needs to acquire the remaining capacity of the power supply, the WIFI module 602 may send an access instruction to the power supply 604 via a bus 606. The access instruction may be an acquisition instruction for acquiring the capacity of the power supply.

After receiving the access instruction, the power supply 604 may parse the access instruction. When the power supply 604 is informed of the access instruction that indicates the capacity of the power supply 604 is to be acquired, the power supply 604 detects the capacity of the power supply, and feeds back the capacity to the WIFI module 602.

In an embodiment, after receiving the capacity, the WIFI module 602 may determine whether to turn off the WIFI module according to the capacity of the power supply 604. For example, when the capacity of the power supply 604 is smaller than a predetermined threshold, the WIFI module is turned off.

Figure 7:
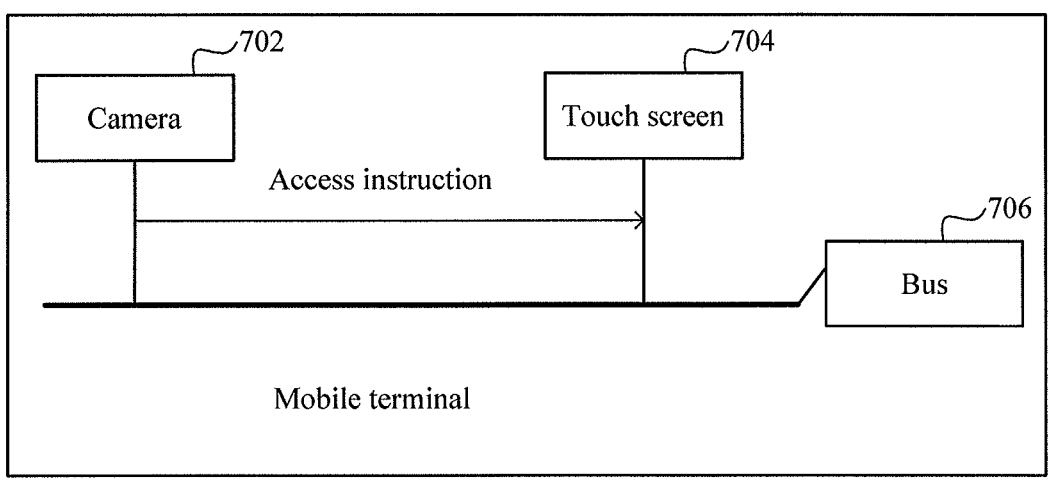
FIG. 7 is a diagram illustrating information interaction between a camera and a touch screen according to an embodiment of the disclosure.

As illustrated FIG. 7, the first peripheral device may be a camera 702, and the second peripheral device may be a touch screen 704. When the camera 702 needs to display a captured picture to a user such that the user may edit the picture, the camera 702 sends an access instruction to the touch screen 704 via a bus 706. The access instruction may be an editing instruction for editing the picture, and the access instruction may also include the picture captured by the camera 702.

After the touch screen 704 receives an access instruction, the touch screen 704 may parse the access instruction to obtain the content of the access instruction. When the touch screen 704 is informed of the access instruction which is an editing instruction for editing a picture, the touch screen 704 may capture an operating track of a user, such that the picture may be edited according to the operating track. For example, the picture may be cut or re-colored.

Figure 8:
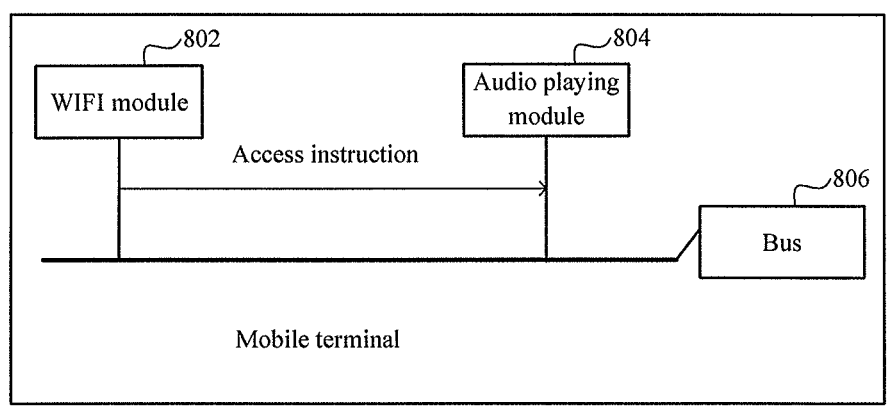
FIG. 8 is a diagram illustrating information interaction between a WIFI module and an audio playing module according to an embodiment of the disclosure.

As illustrated in FIG. 8, the first peripheral device may be a WIFI module 802, and the second peripheral device may be an audio playing module 804. After the WIFI module 802 receives, through the internet, audio data to be played by the audio playing module 804 of the terminal, the WIFI module 802 may send an access instruction to the audio playing module 804 via a bus 806. The access instruction may be an audio playing instruction, and the access instruction may include audio data which has been received by the WIFI module 802.

After the audio playing module 804 receives an access instruction, the audio playing module 804 parses the access instruction to obtain the content of the access instruction. When the audio playing module 804 is informed of the access instruction which is an instruction for playing audio data, the audio playing module 804 may play the audio data.

Figure 9:
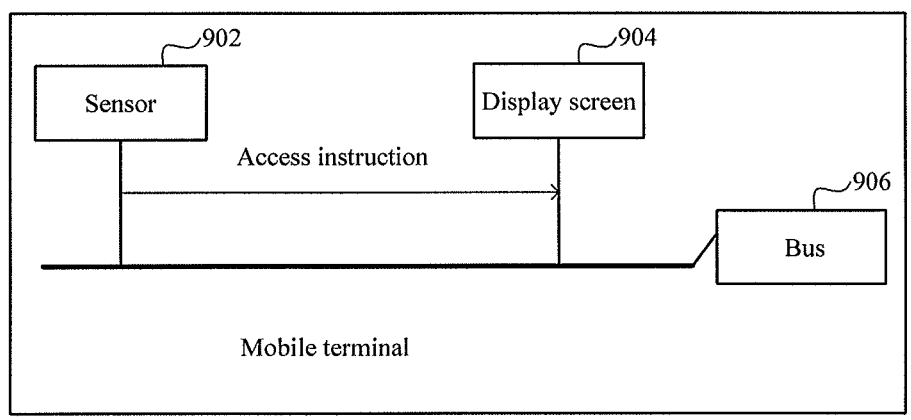
FIG. 9 is a diagram illustrating information interaction between a sensor and a display screen according to an embodiment of the disclosure.

As illustrated in FIG. 9, the first peripheral device may be a sensor 902, and the second peripheral device may be a display screen 904. The sensor 902 may include, but is not limited to, a temperature sensor, an environment brightness sensor, an infrared sensor and the like. After the sensor detects the environment parameters of a current environment and the detected environment parameters show that the display brightness of the display screen 904 of the terminal needs to be adjusted, the sensor 902 may send an access instruction to the display screen 904 via a bus. The access instruction may be a brightness adjustment instruction for adjusting the brightness of the display screen 904, and the access instruction may include sensing data that has been detected by the sensor 902.

After receiving the access instruction, the display screen 904 parses the access instruction to obtain the content of the access instruction. When the display screen 904 is informed of the access instruction which is an instruction for adjusting the display brightness of the display screen 904, the display screen 904 may adjust the display brightness of the display screen 904 according to the sensing data. For example, when the brightness of the current environment is relatively high, the display screen 904 may be lightened. When the brightness of the current environment is relatively low, the display screen 904 may be darkened.

Figure 10:
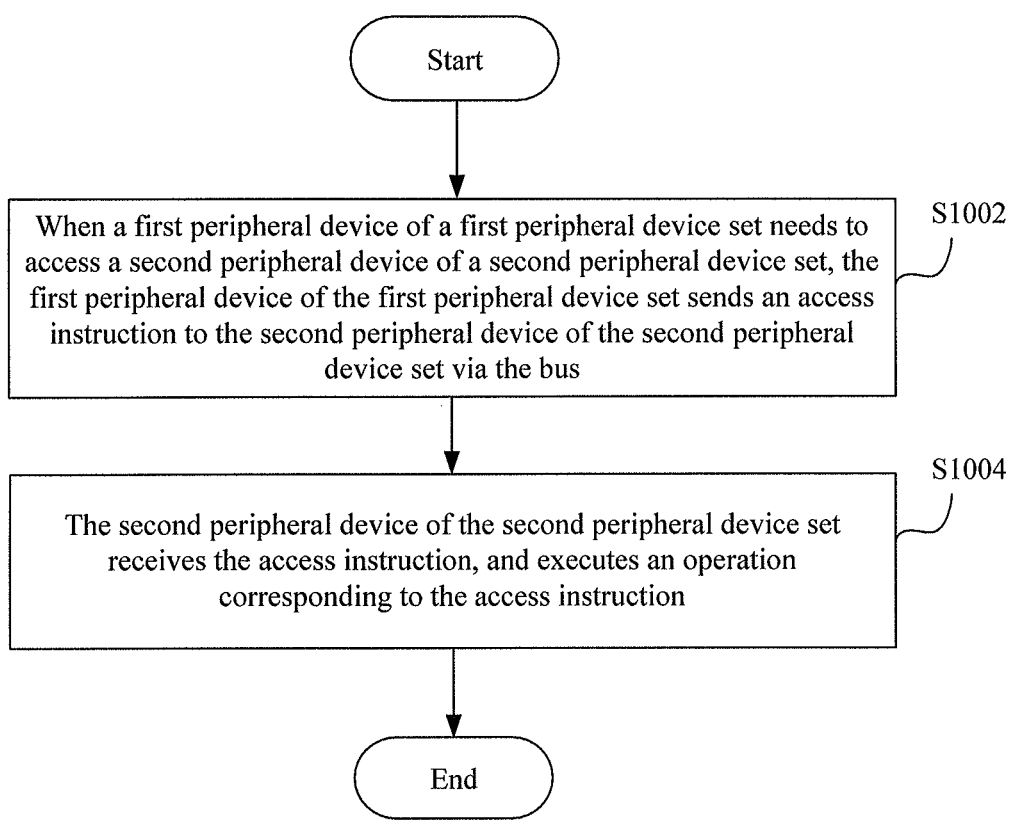
FIG. 10 is a flowchart illustrating a method for performing communication among multiple peripheral devices of a mobile terminal according to an embodiment of the disclosure.

FIG. 10 is a flowchart illustrating a method for performing communication among multiple peripheral devices of a mobile terminal according to an embodiment of the disclosure.

The method as illustrated in FIG. 10 may be applied to a method for performing communication among multiple peripheral devices of a mobile terminal. Here, the mobile terminal may include at least two peripheral device sets and a bus. Each of the at least two peripheral device sets is directly connected to the bus. Each of the at least two peripheral device sets includes at least one peripheral device. The at least two peripheral device sets communicate with each other via the bus.

As illustrated in FIG. 10, the method includes operations illustrated in blocks S1002 and S1004.

In block S1002, when a first peripheral device of a first peripheral device set needs to access a second peripheral device of a second peripheral device set, the first peripheral device of the first peripheral device set sends an access instruction to the second peripheral device of the second peripheral device set via the bus.

In block S1004, the second peripheral device of the second peripheral device set receives the access instruction, executes an operation corresponding to the access instruction.

For example, the first peripheral device set may include N peripheral devices, and the second peripheral device set may include M peripheral devices. Here N and M are integers greater than or equal to 1, and N and M may be equal or unequal. When the first peripheral device of the first peripheral device set attempts to access the second peripheral device of the second peripheral device set, the first peripheral device of the first peripheral device set sends an access instruction to the second peripheral device of the second peripheral device set via the bus. Thus, a device set consisting of a plurality of peripheral devices may be taken as a unit for communication.

In some embodiments, the first peripheral device set may include N peripheral devices, and the second peripheral device set only includes a peripheral device instead of a plurality of peripheral devices. Here, N is an integer greater than or equal to 2. When a first peripheral device of the first peripheral device set attempts to access a second peripheral device of the second peripheral device set, the first peripheral set of the first peripheral device set sends an access instruction to the second peripheral device of the second peripheral device set via the bus. Thus, a peripheral device set may communicate with a peripheral device which is not in this set.

In some embodiments, the first peripheral device set only includes a peripheral device instead of a plurality of peripheral devices, and the second peripheral device set may include M peripheral devices. Here M is an integer greater than or equal to 2. When a first peripheral device of the first peripheral device set attempts to access a second peripheral device of the second peripheral device set, the first peripheral device of the first peripheral device set sends an access instruction to the second peripheral device of the second peripheral device set via the bus. Thus, a peripheral device of a peripheral device set may communicate with a peripheral device which is not in this set.

Figure 11:
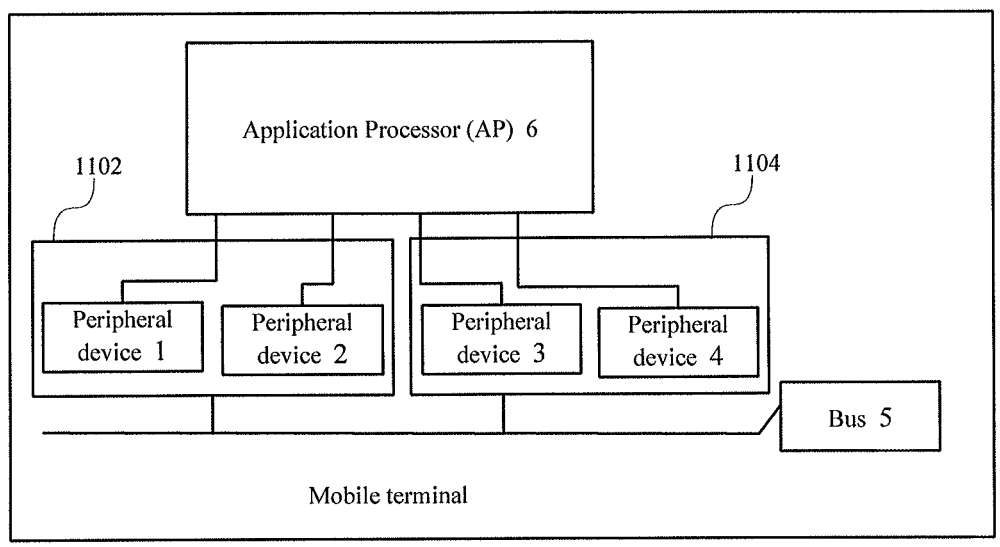
FIG. 11 is a diagram illustrating configuration of a mobile terminal according to an embodiment of the disclosure.

FIG. 11 is a diagram illustrating configuration of a mobile terminal according to an embodiment of the disclosure.

As illustrated in FIG. 11, the mobile terminal includes peripheral device sets 1102 and 1104 and a bus 5. Both the peripheral device sets 1102 and 1104 are directly connected to the bus 5. The peripheral device set 1102 includes a peripheral device 1 and a peripheral device 2. The peripheral device set 1104 includes a peripheral device 3 and a peripheral device 4. The peripheral device sets 1102 and 1104 communicate with each other via the bus 5.

The peripheral device 1 of the peripheral device set 1102 is configured to send, when the peripheral device 1 of the peripheral device set 1102 needs to access the peripheral device 3 of the peripheral device set 1104, an access instruction to the peripheral device 3 of the peripheral device set 1104 via the bus 5.

The peripheral device 3 of the peripheral device set 1104 is configured to receive the access instruction, and execute an operation corresponding to the access instruction.

In one embodiment, the mobile terminal may further include an AP 6. In such a case, the peripheral device sets 1102 and 1104 may be directly connected to the AP 6. However, it is to be understood that the AP 6 is not necessary, and may be omitted as required.

In one embodiment, the peripheral device 1 of the peripheral device set 1102 may be configured to monitor, before the peripheral device 1 of peripheral device set 1102 sends an access instruction to the peripheral device 3 of the peripheral device set 1104 via the bus 5, whether the bus 5 is idle. The peripheral device 1 of the peripheral device set 1102 may be further configured to send, when the peripheral device 1 monitors that the bus 5 is idle, an access instruction to the peripheral device 3 of the peripheral device set 1104 via the bus 5.

The peripheral devices 1-4 may be selected from an RF module, a WIFI module, a power supply, a memory, a camera, a touch screen, an audio playing module, a sensor and a display screen.

Some exemplar application scenarios will be described hereinbelow.

In an application scenario, the peripheral device 1 is the camera, the peripheral device 3 is the memory, the access instruction is a storage instruction and the access instruction contains a picture captured by the camera. In such a case, the peripheral device 3 of the peripheral device set 1104 may be configured to receive the access instruction, and parse the access instruction to obtain the picture, and store the picture.

In an application scenario, the peripheral device 1 is the WIFI module, the peripheral device 3 is the power supply and the access instruction is an acquisition instruction for acquiring the capacity of the power supply. In such as case, the peripheral device 3 of the peripheral device set 1104 may be configured to receive the access instruction, detect the capacity of the power supply and feed back the capacity to the WIFI module.

In an application scenario, the peripheral device 1 is the camera, the peripheral device 3 is the touch screen, the access instruction is a picture editing instruction and the access instruction contains a picture captured by the camera. In such a case, the peripheral device 3 of the peripheral device set 1104 may be configured to receive the access instruction, parse the access instruction to obtain the picture, capture an operating track of a user and edit the picture according to the operating track.

In an application scenario, the peripheral device 1 is the WIFI module, the peripheral device 3 is the audio playing module, the access instruction is an audio playing instruction and the access instruction contains audio data which has been received by the WIFI module. In such a case, peripheral device 3 of the peripheral device set 1104 may be configured to receive the access instruction, parse the access instruction to obtain the audio data and to play the audio data.

FIG. 11 illustrates two peripheral device sets, but it is to be understood that the mobile terminal may include more peripheral device sets. FIG. 11 also illustrates that each peripheral device set includes two peripheral devices, but it is to be understood that each peripheral device set may include more or less than two peripheral devices. For example, a peripheral device set may include a peripheral device, or a peripheral device set may include three, ten or even more peripheral devices.

In addition, the embodiment for communication between the peripheral device 1 and the peripheral device 3 has been described, but it is to be understood that the communication may be communication between any two peripheral devices.

In the embodiment of the disclosure, the hardware architecture of terminal includes at least two peripheral devices and a bus, and each of the peripheral devices is directly connected to the bus. Therefore, all the peripheral devices are connected and communicated with each other via the bus. For example, when a first peripheral device needs to access a second peripheral device, i.e., when a first peripheral device sends an access instruction to a second peripheral device via a bus, the second peripheral device executes an operation corresponding to the access instruction. Therefore, communications between peripheral devices do not need to be transferred by an AP, thereby alleviating burdens on the AP, and improving the efficiency of the communication between the peripheral devices.

Although the disclosure is described in conjunction with various embodiments here, a person skilled in the art can understand and achieve other variations of the disclosed embodiment in a process of implementing the claimed disclosure by making reference to the drawings, the disclosure and the appended claims. In the claims, "comprising" does not exclude other compositions or operations, and "a" or "one" does not exclude plurality. A single processor or other units may achieve a plurality of functions exemplified in the claims. Some means are recited in different dependent claims, but this does not represent that these means cannot be combined to generate a good effect.

A person skilled in the art will understand that the embodiments of the disclosure may be provided as a method, an apparatus (device) or a computer program product. Thus, forms of complete hardware embodiments, complete software embodiments or embodiments integrating software and hardware may be adopted in the disclosure. Moreover, a form of the computer program product implemented on one or more computer-readable storage medium (including, but not limited to, a disk memory, a CD-ROM, an optical memory and the like) containing computer-readable program codes may be adopted in the disclosure. The computer programs are stored/distributed in/over appropriate medium. The computer programs and other hardware are provided together or the computer programs are provided as part of the hardware, or other distribution forms, such as an Internet form or other wired or wireless telecommunication system forms, may be adopted for the computer programs.

The disclosure is described with reference to flowcharts and/or block diagrams of the method, the apparatus (device) and the computer program product according to the embodiments of the disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to operate in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation on the computers or the other programmable devices, and therefore the instructions executed on the computers or the other programmable devices provide operations of achieving the functions designated in one or more flows of the flowcharts and/or one or more blocks of the block diagrams.

Although the disclosure is described in conjunction with specific features and embodiments of the disclosure, it is apparent that various modifications and changes may be made to the disclosure without departing from the spirit and scope of the disclosure. Accordingly, the present description and accompanying drawings are merely exemplary illustrations to the disclosure defined by the appended claims, and the disclosure is intended to cover any and all modifications, changes, combinations or equivalents within the scope of the disclosure. It is apparent that a person skilled in the art may make various modifications and transformations to the disclosure without departing from the spirit and scope of the disclosure. Thus, if these modifications and transformations of the disclosure fall within the scope of the claims of the disclosure and an equivalent technology thereof, the disclosure is also intended to include these modifications and transformations.

The invention claimed is:

1. A mobile terminal, comprising at least two peripheral devices and a bus, each of the at least two peripheral devices being directly connected to the bus, wherein any two peripheral devices in the at least two peripheral devices directly connect with each other via the bus and can directly communicate with each other via the bus, and wherein
 a first peripheral device of the at least two peripheral devices is configured to send, when the first peripheral device needs to access a second peripheral device of the at least two peripheral devices, an access instruction to the second peripheral device via the bus, the access instruction comprising an identifier of a peripheral device to be accessed; and
 the second peripheral device is configured to receive the access instruction via the bus, determine whether the identifier carried in the access instruction is matched with its own identifier, when the identifier carried in the access instruction is matched with an identifier of the second peripheral device, parse the access instruction and execute an operation corresponding to the access instruction, and
 wherein the access instruction of each peripheral device is transferred via the bus, and each peripheral device monitors, via the bus, whether there is an access instructon sent to itself.

2. The mobile terminal according to claim 1, further comprising an Application Processor (AP), wherein the at least two peripheral devices are directly connected to the AP.

3. The mobile terminal according to claim 1, wherein the first peripheral device is configured to monitor, before the first peripheral device sends an access instruction to the second peripheral device via the bus, whether the bus is idle; and
 the first peripheral device is further configured to send, when it is monitored by the first peripheral device that the bus is idle, an access instruction to the second peripheral device via the bus.

4. The mobile terminal according to claim 2, wherein the at least two peripheral devices are at least two selected from a group consisting of a Radio Frequency (RF) module, a Wireless Fidelity (WIFI) module, a power supply, a memory, a camera, a touch screen, an audio playing module, a sensor and a display screen.

5. The mobile terminal according to claim 4, wherein the first peripheral device is the camera, the second peripheral device is the memory, the access instruction is a storage instruction and the access instruction contains a picture captured by the camera, and
 wherein the second peripheral device is configured to receive the access instruction, parse the access instruction to obtain the picture, and store the picture.

6. The mobile terminal according to claim 4, wherein the first peripheral device is the WIFI module, the second peripheral device is the power supply and the access instruction is an acquisition instruction for acquiring capacity of the power supply, and
 wherein the second peripheral device is configured to receive the access instruction, detect its own capacity, and feed back the capacity to the WIFI module.

7. The mobile terminal according to claim 4, wherein the first peripheral device is the camera, the second peripheral device is the touch screen, the access instruction is a picture editing instruction and the access instruction contains a picture captured by the camera, and
 wherein the second peripheral device is configured to receive the access instruction, parse the access instruction to obtain the picture, capture an operating track of a user, and edit the picture according to the operating track.

8. The mobile terminal according to claim 4, wherein the first peripheral device is the WIFI module, the second peripheral device is the audio playing module, the access instruction is an audio playing instruction and the access instruction contains audio data received by the WIFI module, and
 wherein the second peripheral device is configured to receive the access instruction, parse the access instruction to obtain the audio data and play the audio data.

9. The mobile terminal according to claim 4, wherein the first peripheral device comprises the sensor, the second peripheral device comprises the display screen, the access instruction is a brightness adjustment instruction for adjusting brightness of the display screen, and the access instruction contains sensing data that has been sensed by the sensor; and
 the second peripheral device is configured to receive the access instruction, parse the access instruction to obtain the sensing data, and adjust the brightness of the display screen according to the sensing data.

10. The mobile terminal according to claim 1, wherein
 the second peripheral device is further configured to feed back, after the second peripheral device executes the operation corresponding to the access instruction, information about a result of the operation to the first peripheral device; and
 the first peripheral device is further configured to adjust its own state according to the information about the result of the operation.

11. A method for performing communication among a plurality of peripheral devices of a mobile terminal, the mobile terminal comprising at least two peripheral device sets and a bus, each of the at least two peripheral device sets being directly connected to the bus, each of the at least two peripheral device sets comprising at least one peripheral device, wherein any two peripheral devices in the at least two peripheral device sets directly connect with each other via the bus and can directly communicate with each other via the bus, the method comprising:
 when a first peripheral device of a first peripheral device set needs to access a second peripheral device of a second peripheral device set, sending, by the first peripheral device of the first peripheral device set, an access instruction to the second peripheral device of the second peripheral device set via the bus, the access instruction comprising an identifier of a peripheral device to be accessed;
 receiving, by the second peripheral device of the second peripheral device set, the access instruction via the bus;
 determining, by the second peripheral device of the second peripheral device set, whether the identifier carried in the access instruction is matched with its own identifier; and
 when the identifier carried in the access instruction is matched with an identifier of the second peripheral device, parsing, by the second peripheral device of the second peripheral device set, the access instruction and executing an operation corresponding to the access instruction, wherein the access instruction of each peripheral device is transferred via the bus, and each peripheral device monitors, via the bus, whether there is an access instruction sent to itself.

12. The method according to claim 11, further comprising:
before the first peripheral device of the first peripheral device set sends an access instruction to the second peripheral device of the second peripheral device set via the bus, monitoring whether the bus is idle; and
when it is monitored by the first peripheral device of the first peripheral device set that the bus is idle, sending, by the first peripheral device of the first peripheral device set, the access instruction to the second peripheral device of the second peripheral device set via the bus.

13. A mobile terminal, comprising at least two peripheral device sets and a bus, each of the at least two peripheral device sets being directly connected to the bus, each of the at least two peripheral device sets comprising at least one peripheral device, wherein any two peripheral devices in the at least two peripheral device sets directly connect with each other via the bus and can directly communicate with each other via the bus, and
wherein a first peripheral device of a first peripheral device set of the at least two peripheral device sets is configured to send, when the first peripheral device of the first peripheral device set needs to access a second peripheral device of a second peripheral device set of the at least two peripheral device sets, an access instruction to the second peripheral device of the second peripheral device set via the bus, the access instruction comprising identifier of a peripheral device to be accessed; and
the second peripheral device of the second peripheral device set is configured to receive the access instruction via the bus, determine whether the identifier carried in the access instruction is matched with its own identifier, when the identifier carried in the access instruction is matched with an identifier of the second peripheral device, parse the access instruction and execute an operation corresponding to the access instruction, and
wherein the access instruction of each peripheral device is transferred via the bus, and each peripheral device monitors, via the bus, whether there is an access instruction sent to itself.

14. The mobile terminal according to claim 13, further comprising an Application Processor (AP), wherein the at least two peripheral device sets are directly connected to the AP.

15. The mobile terminal according to claim 13, wherein the first peripheral device of the first peripheral device set is configured to monitor, before the first peripheral device of the first peripheral device set sends an access instruction to the second peripheral device of the second peripheral device set via the bus, whether the bus is idle; and
the first peripheral device of the first peripheral device set is further configured to send, when it is monitored by the first peripheral device of the first peripheral device set that the bus is idle, the access instruction to the second peripheral device of the second peripheral device set via the bus.

16. The mobile terminal according to claim 13, wherein the at least one peripheral device is selected from a group consisting of a Radio Frequency (RF) module, a Wireless Fidelity (WIFI) module, a power supply, a memory, a camera, a touch screen, an audio playing module, a sensor and a display screen.

17. The mobile terminal according to claim 16, wherein the first peripheral device is the camera, the second peripheral device is the memory, the access instruction is a storage instruction and the access instruction contains a picture captured by the camera, and
wherein the second peripheral device of the second peripheral device set is configured to receive the access instruction, parse the access instruction to obtain the picture and store the picture.

18. The mobile terminal according to claim 16, wherein the first peripheral device is the WIFI module, the second peripheral device is the power supply and the access instruction is an acquisition instruction for acquiring capacity of the power supply, and
wherein the second peripheral device of the second peripheral device set is configured to receive the access instruction, detect the capacity of the power supply and feed back the capacity to the WIFI module.

19. The mobile terminal according to claim 16, wherein the first peripheral device is the camera, the second peripheral device is the touch screen, the access instruction is a picture editing instruction and the access instruction contains a picture captured by the camera, and
wherein the second peripheral device of the second peripheral device set is configured to receive the access instruction, parse the access instruction to obtain the picture, capture an operating track of a user and edit the picture according to the operating track.

20. The mobile terminal according to claim 16, wherein the first peripheral device is the WIFI module, the second peripheral device is the audio playing module, the access instruction is an audio playing instruction and the access instruction contains audio data received by the WIFI module, and
wherein the second peripheral device of the second peripheral device set is configured to receive the access instruction, parse the access instruction to obtain the audio data and play the audio data.

* * * * *

UNITED STATES PATENT AND TRADEMARK OFFICE
CERTIFICATE OF CORRECTION

PATENT NO. : 10,635,608 B2  
APPLICATION NO. : 15/805879  
DATED : April 28, 2020  
INVENTOR(S) : Jian Bai Page 1 of 1

It is certified that error appears in the above-identified patent and that said Letters Patent is hereby corrected as shown below:

On the Title Page

Item (73) Assignee:
"GUANGDONG OPPO MOBILE TELECOMMUNICATIONS CORP., LTD., Dongguan (CN)"
Should read:
--GUANGDONG OPPO MOBILE TELECOMMUNICATIONS CORP., LTD., Dongguan, Guangdong (CN)--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*